US011934808B2

(12) United States Patent
Kurabayashi et al.

(10) Patent No.: US 11,934,808 B2
(45) Date of Patent: Mar. 19, 2024

(54) SCREEN TRANSITION CONSOLIDATION APPARATUS, SCREEN TRANSITION CONSOLIDATION METHOD AND PROGRAM

(71) Applicant: NIPPON TELEGRAPH AND TELEPHONE CORPORATION, Tokyo (JP)

(72) Inventors: Toshiyuki Kurabayashi, Tokyo (JP); Haruto Tanno, Tokyo (JP); Yu Adachi, Tokyo (JP); Hiroyuki Kirinuki, Tokyo (JP); Yu Yoshimura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 115 days.

(21) Appl. No.: 17/615,066

(22) PCT Filed: May 31, 2019

(86) PCT No.: PCT/JP2019/021840
§ 371 (c)(1),
(2) Date: Nov. 29, 2021

(87) PCT Pub. No.: WO2020/240859
PCT Pub. Date: Dec. 3, 2020

(65) Prior Publication Data
US 2022/0222051 A1 Jul. 14, 2022

(51) Int. Cl.
*G06F 8/38* (2018.01)
*G06F 8/41* (2018.01)
(Continued)

(52) U.S. Cl.
CPC .............. *G06F 8/38* (2013.01); *G06F 8/4436* (2013.01); *G06F 8/75* (2013.01); *G06F 18/2323* (2023.01)

(58) Field of Classification Search
CPC . G06F 8/38; G06F 8/4436; G06F 8/75; G06F 18/2323; G06F 8/74
See application file for complete search history.

(56) References Cited

U.S. PATENT DOCUMENTS

2013/0055026 A1* 2/2013 Hatano .................. G06F 11/263
714/E11.177
2015/0248190 A1* 9/2015 Matsumoto ........... G06F 40/106
715/746

(Continued)

OTHER PUBLICATIONS

Kurabayashi et al. (2017) "Automatic Test Script Generation on GUI Testing" IPSJ/SIGSE Software Engineering Symposium (SES2017), Aug. 31, 2017, pp. 260-264.

*Primary Examiner* — Keith D Bloomquist

(57) ABSTRACT

A screen transition aggregation device includes a calculation unit configured to calculate a degree of similarity between a transition destination screen and a transition source screen in order from an end screen in a screen transition diagram; and a generation unit configured to classify the transition destination screen and the transition source screen into groups based on a comparison between the degree of similarity and a threshold value, and to generate information indicating a transition relationship between the groups. Thus, the ease of grasping the specifications of an application that provides a function by screen transition is improved.

20 Claims, 21 Drawing Sheets

(51) Int. Cl.
*G06F 8/75* (2018.01)
*G06F 18/2323* (2023.01)

(56) References Cited

U.S. PATENT DOCUMENTS

| | | | |
|---|---|---|---|
| 2018/0181550 A1* | 6/2018 | Koreki | G06F 8/38 |
| 2020/0042567 A1* | 2/2020 | Birch | G06F 40/134 |
| 2021/0117616 A1* | 4/2021 | Kurabayashi | G06F 11/3688 |

* cited by examiner

SCREEN TRANSITION CONSOLIDATION APPARATUS, SCREEN TRANSITION CONSOLIDATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/021840, filed on 31 May 2019, the disclosure of which is hereby incorporated herein by reference in its entirety.

TECHNICAL FIELD

The present invention relates to a screen transition aggregation device, a screen transition aggregation method, and a program.

BACKGROUND ART

To quickly provide services that meet diversified consumer needs, agile-type application development (hereinafter referred to as "agile development") is increasing. The agile development has advantages in being capable of receiving much feedback by creating an application that actually works and continuing to release the created application frequently rather than creating a document such as a design document, but has a drawback in the difficulty for grasping the specifications because there is no document. Therefore, there is an increasing demand for the reverse engineering technology that restores the specifications for the current application.

As the known reverse engineering technology, there is a method of crawling a Web application to restore specification information, and outputting the specification information as a screen transition diagram (Non Patent Literature 1). According to this method, it is possible to automatically generate the screen transition diagram of the application and thus to grasp the specifications at low cost.

CITATION LIST

Non Patent Literature

Non Patent Literature 1: Toshiyuki Kurabayashi, Muneyoshi Iyama, Hiroyuki Kirinuki, and Haruto Tanno, "Automatic Test Script Generation on GUI Testing", Software Engineering Symposium 2017 Papers pp. 260-264, September 2017

SUMMARY OF THE INVENTION

Technical Problem

However, as the size of the application increases and the number of screens increases, the screen transition diagram also becomes larger, and it is difficult to grasp the specification.

The present invention has been made in view of the above points, and an object of the present invention is to improve the ease of grasping the specifications of an application that provides a function by screen transition.

Means for Solving the Problem

To solve the above problem, a screen transition aggregation device includes a calculation unit configured to calculate a degree of similarity between a transition destination screen and a transition source screen in order from an end screen in a screen transition diagram; and a generation unit configured to classify the transition destination screen and the transition source screen into groups based on a comparison between the degree of similarity and a threshold value, and to generate information indicating a transition relationship between the groups.

Effects of the Invention

It is possible to improve the ease of grasping the specifications of an application that provides a function by screen transition.

DESCRIPTION OF EMBODIMENTS

Figure 1:
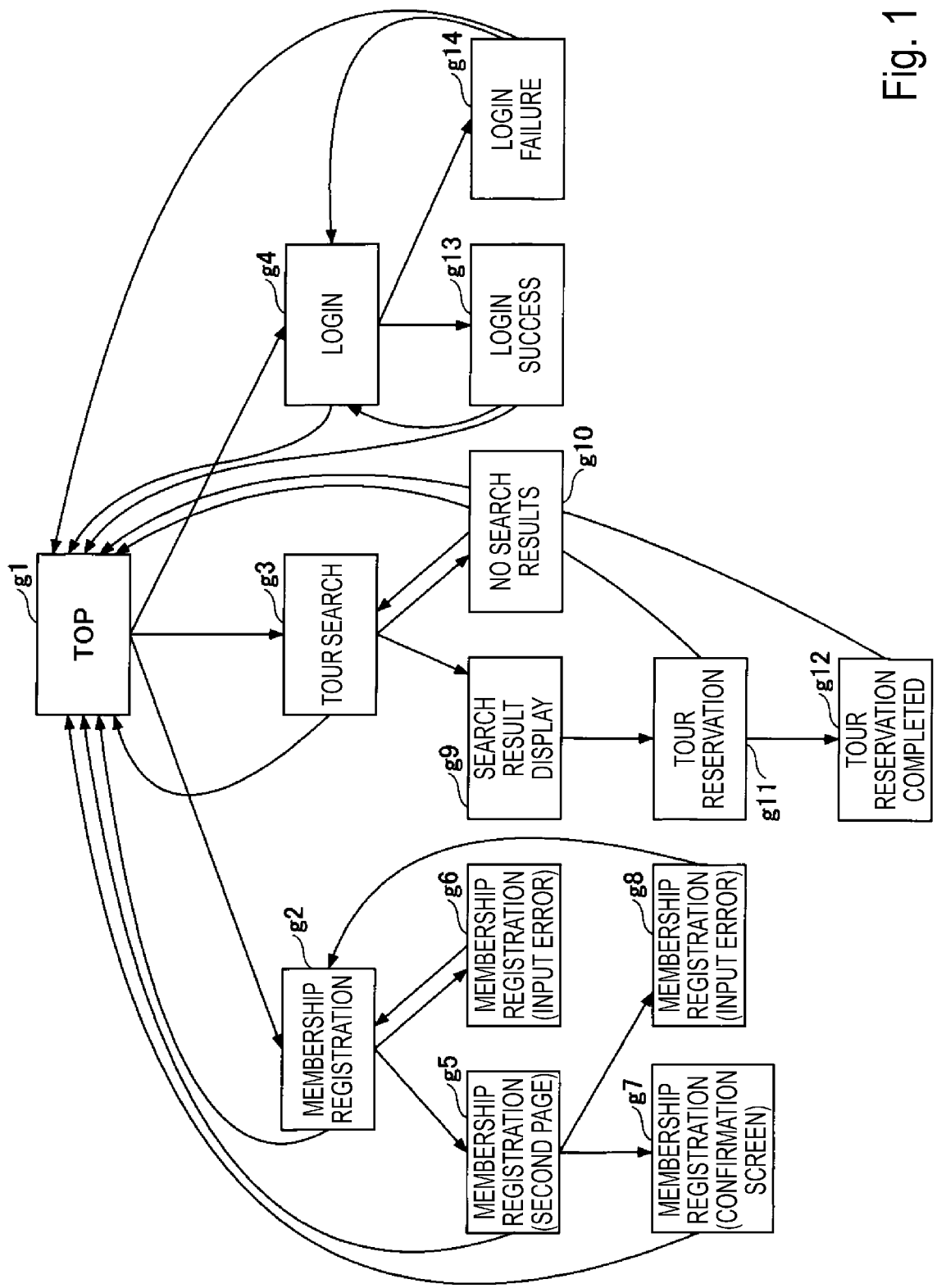
FIG. 1 is a screen transition diagram illustrating an outline of an embodiment.
Figure 2:
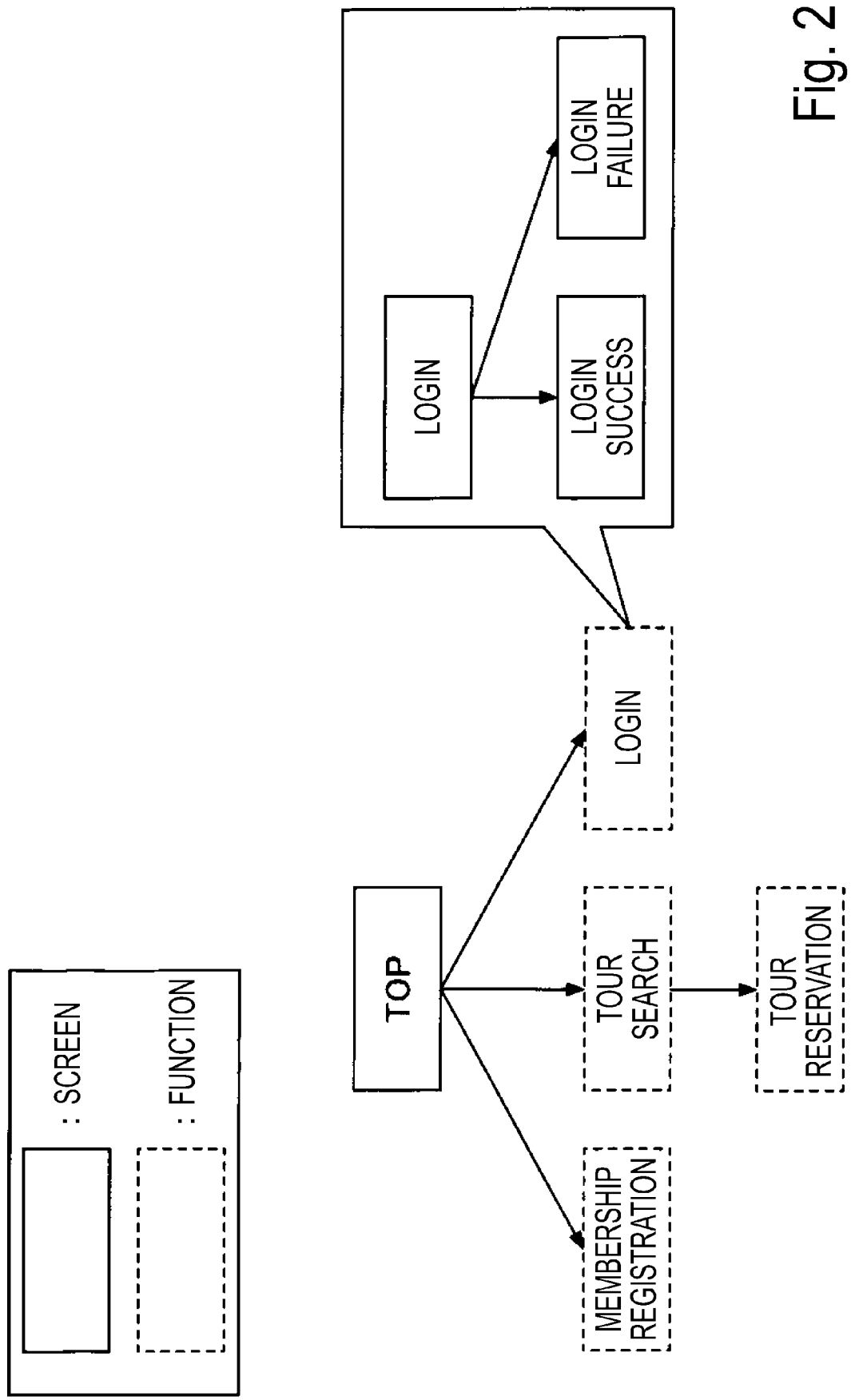
FIG. 2 is a functional flow diagram illustrating the outline of the embodiment.

An embodiment of the present invention will be described below with reference to the drawings. Because an application such as a Web application is generally divided for each function, it is considered easy to understand that each screen in a screen transition diagram is grouped into units of function, and the screen transition diagram is aggregated into information indicating a transition relationship between groups (hereinafter referred to as a "functional flow diagram"). For example, a functional flow diagram as illustrated in FIG. 2 is obtained by grouping the screen included in the screen transition diagram illustrated in FIG. 1 for a certain application by functional units of the application. It is easier to understand what the application works with the functional flow diagram as illustrated in FIG. 2 instead of the screen transition diagram as illustrated in FIG. 1.

There are a variety of automatic screen classification methods. For example, Orihara and Utsumi classify HTML by comparing structural closeness using information or the like on the tree structure of the HTML tags between screens (Orihara Hiroshi, Akira Utsumi, "Web Document Clustering Using HTML Tags", Information Processing Society of Japan Journal Vol. 49 No. 8, August 2008).

However, when the known methods are simply used to create a functional flow diagram from the screen transition diagram, the degree of similarity is compared between all screens with ignoring the structure of the screen transition diagram. Thus, screens having clearly different functions may be determined to be the same function. For example, in the screen transition diagram of FIG. 1, a situation may occur in which screens considered to be the structurally different functions in the screen transition diagram may be determined to be the same screens, such as two screens of "membership registration (confirmation screen)" and "login failure".

Therefore, in the embodiment, a technology as follows is disclosed: for each screen constituting a node in the screen transition diagram, a classification (grouping) is performed based on the similarity with a screen as a transition source in order from an end screen, so that grouping of screens in distant places on the structure of the screen transition diagram is prevented, and a functional flow diagram close to the original functional flow of an application as a test target is automatically generated.

Figure 3:
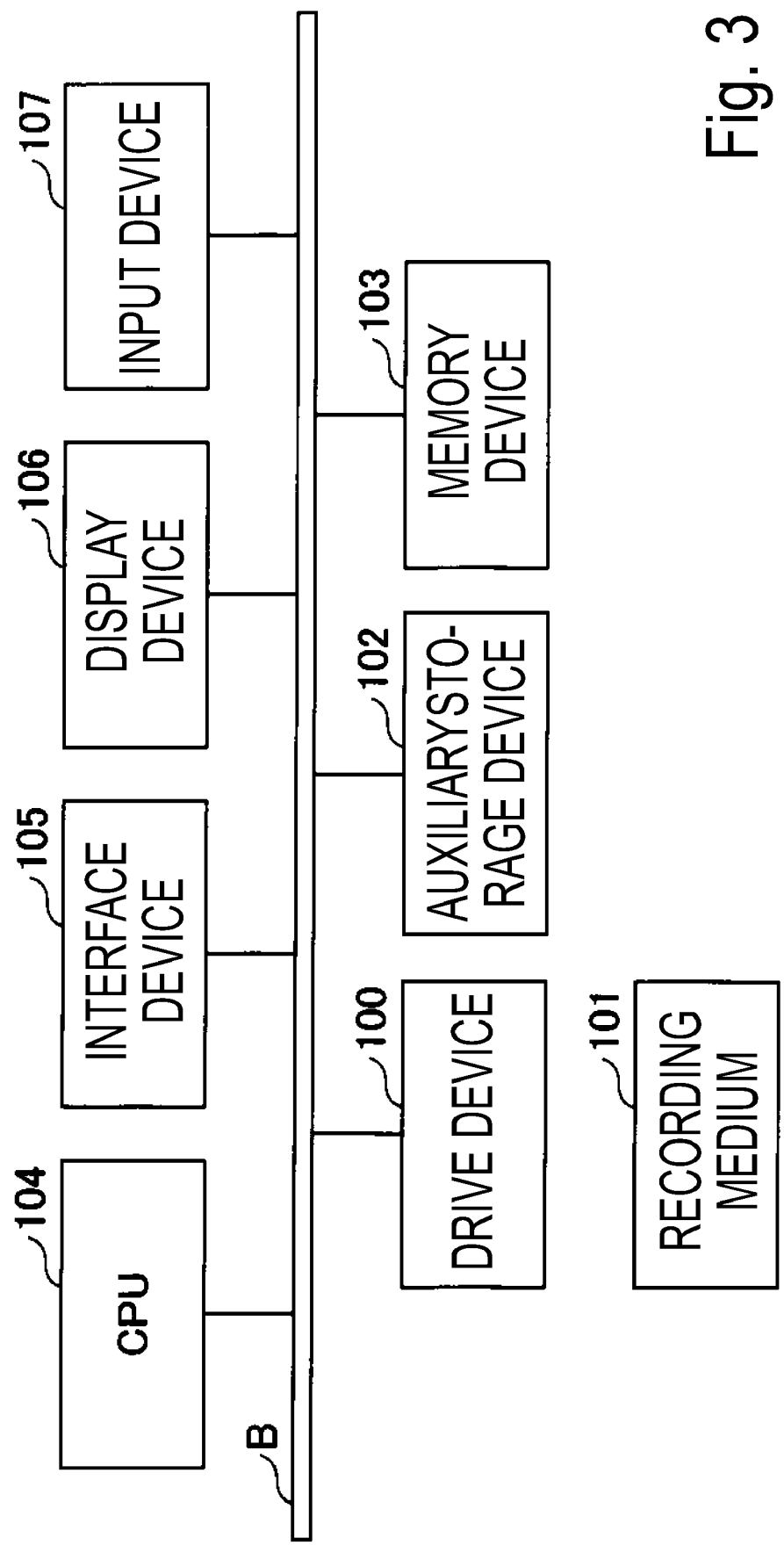
FIG. 3 is a diagram illustrating a hardware configuration example of a screen transition aggregation device 10 in the embodiment of the present invention.

FIG. 3 is a diagram illustrating a hardware configuration example of a screen transition aggregation device 10 in the embodiment of the present invention. The screen transition aggregation device 10 in FIG. 3 includes a drive device 100, an auxiliary storage device 102, a memory device 103, a CPU 104, an interface device 105, a display device 106, an input device 107, and the like, which are connected to each other through a bus B.

A program for realizing processing in the screen transition aggregation device 10 is provided by a recording medium 101 such as a CD-ROM. When the recording medium 101 in which a program is stored is set in the drive device 100, the program is installed in the auxiliary storage device 102 from the recording medium 101 through the drive device 100. However, the program is not necessarily installed by the recording medium 101, and may be downloaded from another computer through a network. The auxiliary storage device 102 stores the installed program and stores necessary files, data, and the like.

In a case where an instruction for starting a program has been given, the memory device 103 reads the program from the auxiliary storage device 102 and stores the program. The CPU 104 realizes a function relevant to the screen transition aggregation device 10 in accordance with the program stored in the memory device 103. The interface device 105 is used as an interface for connection to a network. The display device 106 displays a graphical user interface (GUI) or the like based on the program. The input device 107 is constituted by a keyboard, a mouse, and the like, and is used for inputting various operation instructions.

Figure 4:
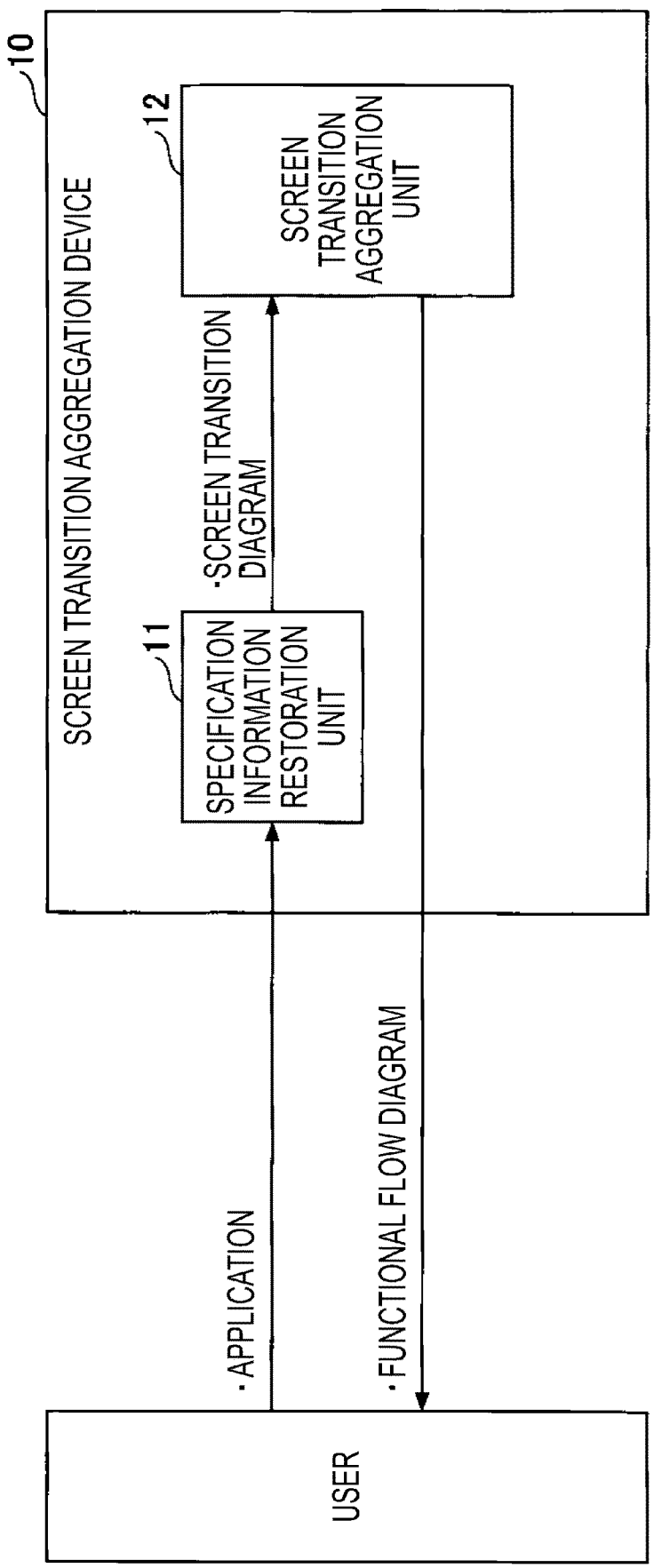
FIG. 4 is a diagram illustrating a functional configuration example of the screen transition aggregation device 10 in the embodiment of the present invention.

FIG. 4 is a diagram illustrating a functional configuration example of the screen transition aggregation device 10 in the embodiment of the present invention. In FIG. 4, the screen transition aggregation device 10 includes a specification information restoration unit 11 and a screen transition aggregation unit 12. One or more programs installed on the screen transition aggregation device 10 cause the CPU 104 to execute processing, thereby implementing the units.

Figure 5:
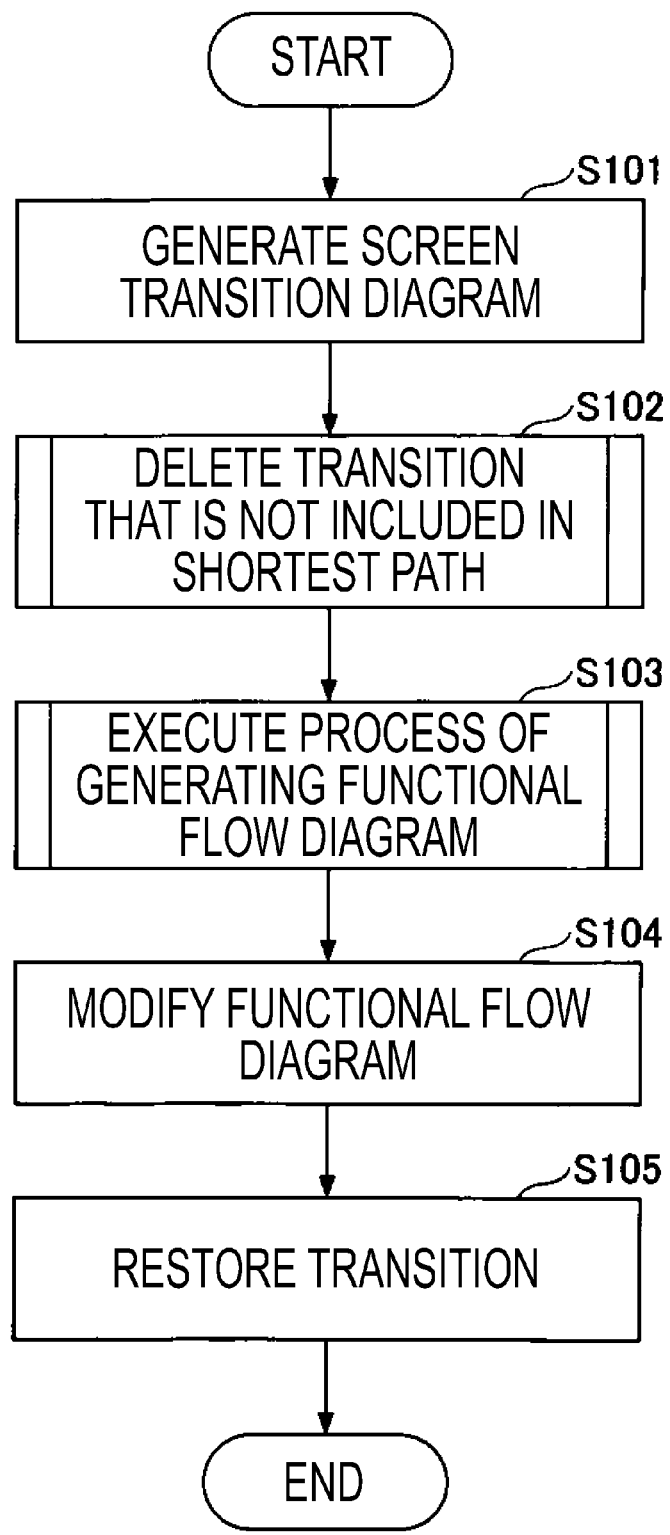
FIG. 5 is a flowchart illustrating an example of a processing procedure executed by the screen transition aggregation device 10.

Hereinafter, a processing procedure executed by the screen transition aggregation device 10 will be described. FIG. 5 is a flowchart illustrating an example of a processing procedure executed by the screen transition aggregation device 10.

In Step S101, the specification information restoration unit 11 automatically generates a screen transition diagram (hereinafter referred to as a "screen transition diagram X") by applying the reverse base test technique disclosed in Non Patent literature 1 to an application (hereinafter referred to as a "target application") as a test target or an analysis target. Here, the screen transition diagram illustrated in FIG. 1 is supposed to be generated. Each node (each rectangle) in the screen transition diagram corresponds to a screen, and an arrow between the nodes indicates a transition from a screen as the source of the arrow to a screen as the destination of the arrow. That is, the source side of the arrow corresponds to a transition source screen, and the tip side of the arrow corresponds to a transition destination screen. The specification information restoration unit 11 inputs the generated screen transition diagram to the screen transition aggregation unit 12.

The screen transition aggregation unit 12 deletes a transition that is not included in any of the shortest paths from a root node (TOP screen) to each screen (each node) in a transition group included in the screen transition diagram X (S102). At this time, the screen transition aggregation unit 12 stores information (hereinafter referred to as "transition information") indicating the deleted transition, for example, in the memory device 103. The transition information is information including, for example, identification information on the transition source screen and identification information on the transition destination screen. The screen transition diagram in which the transition has been deleted from the screen transition diagram X is hereinafter referred to as a "screen transition diagram X'".

The screen transition aggregation unit 12 executes a generation process of the functional flow diagram for the screen transition diagram X', and displays the generated functional flow diagram on the display device 106 (S103). In Step S103, in order from the end screen where no transition destination is present in screen transition diagram X', the degree of similarity between the transition source screen and the transition destination screen is calculated using a well-known automatic screen classification method. When the degree of similarity is equal to or greater than a threshold value, the transition destination screen and the transition source screen are classified into the same group (the same function). When the degree of similarity is smaller than the threshold value, the transition destination screen and the transition source screen are classified into different groups (different functions). In the embodiment, the higher the similarity between the two, the greater the degree of similarity in the embodiment. An index having a value that decreases with the higher similarity may be used as the degree of similarity. In this case, the determination result based on the comparison with the threshold value may be reversed from that of the embodiment.

The screen transition aggregation unit 12 receives, from a user, a modification and the like of the displayed functional flow diagram (S104). For example, a function name is input by the user for each node (each function) in the functional flow diagram. Modifications may also be made when there is an error in the classification result of the group.

The screen transition aggregation unit 12 adds (restores) the transition deleted in Step S102 to the functional flow diagram (S105). Specifically, the screen transition aggregation unit 12 adds a transition related to transition information to the functional flow diagram, based on the transition information stored in the memory device 103 as transition information for the transition deleted in Step S102. As a result, the functional flow diagram is completed.

Figure 6:
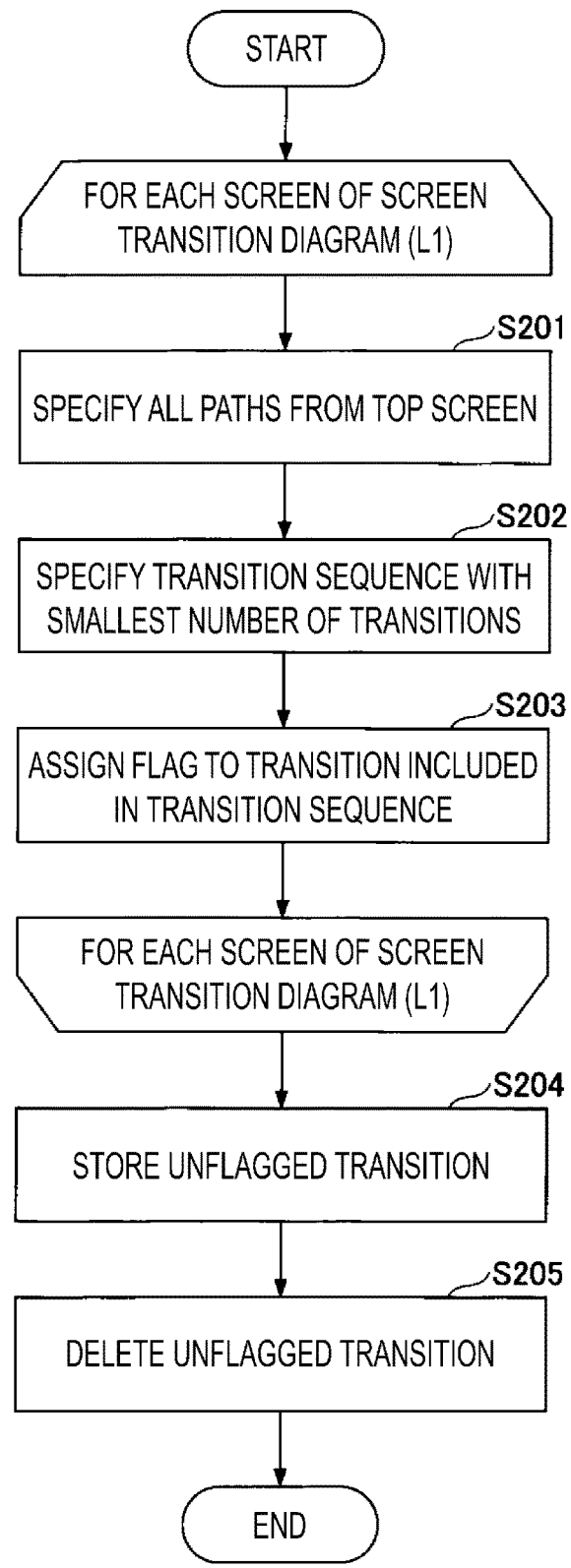
FIG. 6 is a flowchart illustrating an example of a processing procedure of a deletion process of a transition that is not included in any shortest path.

Subsequently, details of Step S102 will be described. FIG. 6 is a flowchart illustrating an example of a processing procedure of a deletion process of a transition that is not included in any shortest path.

The screen transition aggregation unit 12 firstly executes a loop process L1 including Steps S201 to S203 for each screen (node) included in the screen transition diagram X. The screen as a processing target in the loop process is hereinafter referred to as a "target screen".

In Step S201, the screen transition aggregation unit 12 specifies all paths of a node of the target screen from the TOP screen (root node) in the screen transition diagram X. Then, the screen transition aggregation unit 12 specifies the transition sequence of the route having the smallest number of transitions in the specified route group (S202). When a plurality of routes are specified in Step S201, a plurality of transition sequences are specified. The screen transition aggregation unit 12 assigns a flag to each transition included in each transition sequence (S203).

When the loop process L1 is completed, the screen transition aggregation unit 12 stores, for example, the transition information regarding all the transitions to which the flag is not assigned in the transition group included in the screen transition diagram X, in the memory device 103 (S204). The screen transition aggregation unit 12 deletes all the transitions to which the flag is not assigned, from the screen transition diagram X to generate a screen transition diagram X' (S205).

Figure 7:
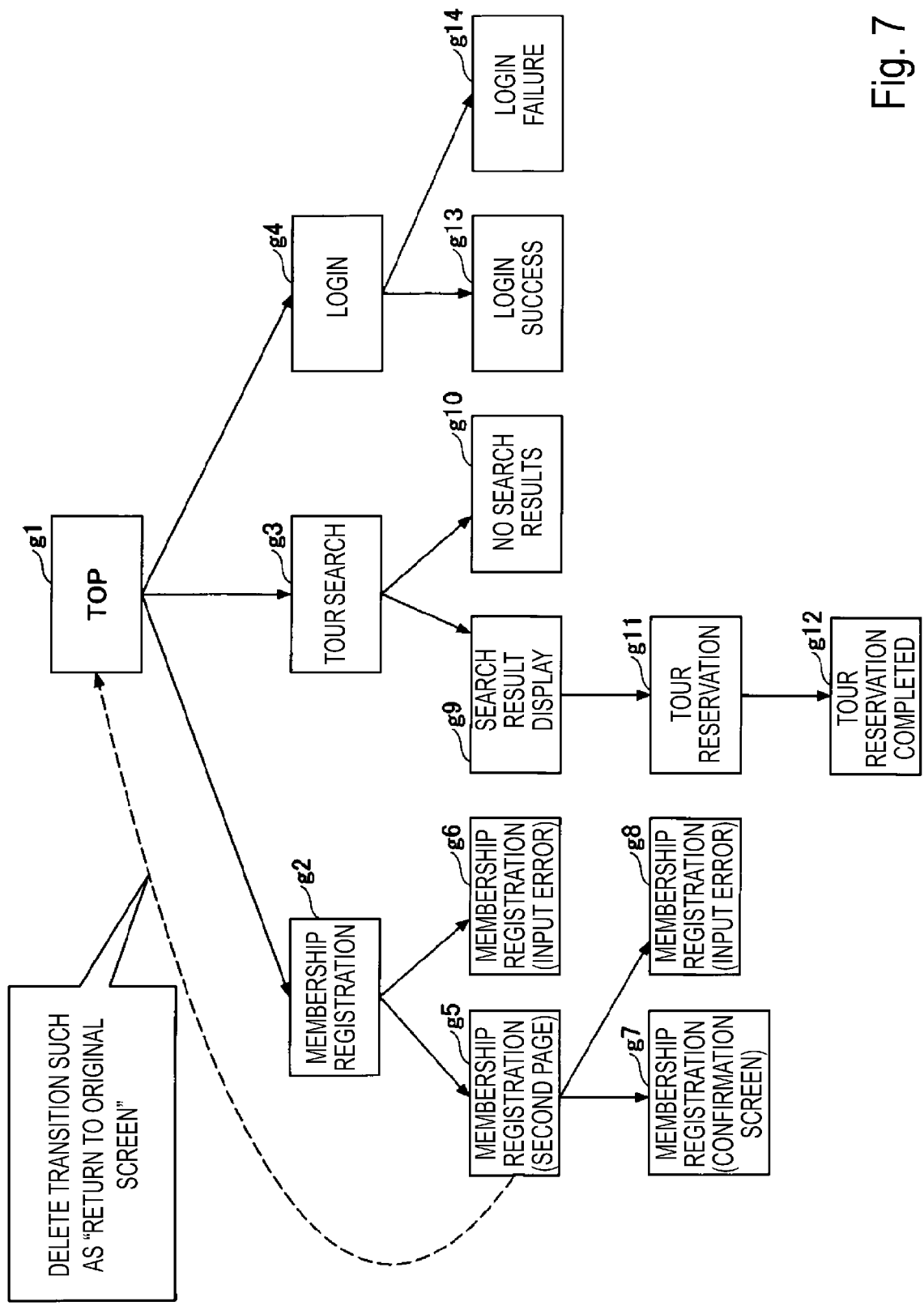
FIG. 7 is a diagram illustrating an example of a screen transition diagram X'.

FIG. 7 is a diagram illustrating an example of the screen transition diagram X'. FIG. 7 illustrates an example in which a transition that is not included in any of the shortest paths is deleted from the screen transition diagram X illustrated in FIG. 1. As illustrated in FIG. 7, for example, a transition such as "return to the transition source screen" is also deleted.

Figure 8:
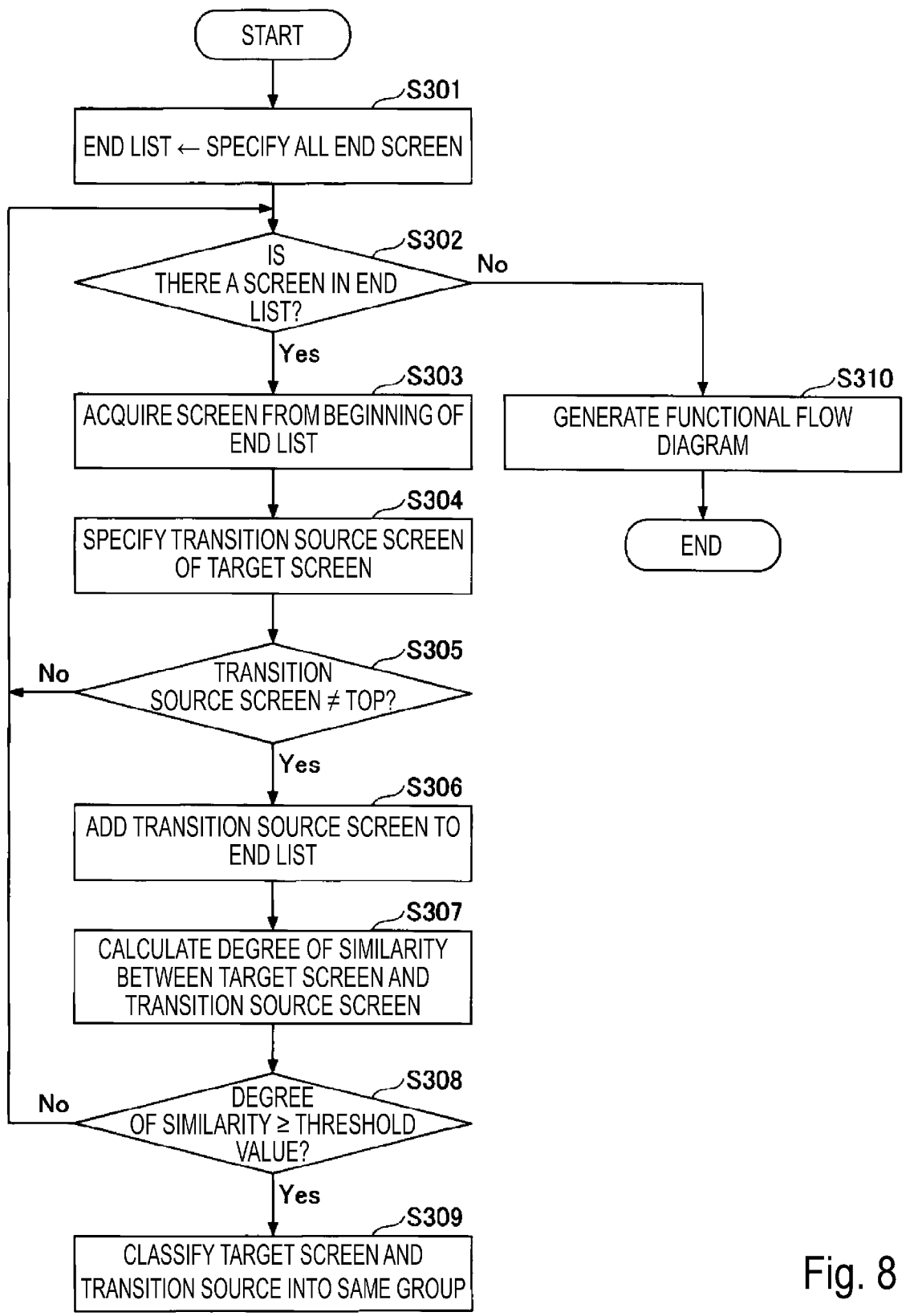
FIG. 8 is a flowchart illustrating an example of a processing procedure of a generation process of a functional flow diagram.

Subsequently, details of Step S103 will be described. FIG. 8 is a flowchart illustrating an example of a processing procedure of a generation process of a functional flow diagram.

In Step S301, the screen transition aggregation unit 12 specifies all end nodes (end screens) in the screen transition diagram X', and generates a list (hereinafter referred to as an "end list") of the identification information (hereinafter referred to as a "screen ID") of each specified end screen. The end list is FIFO (First-In First-Out) type data.

The screen transition aggregation unit 12 determines whether or not one or more screen IDs are included in the end list (S302). When the end list is not empty (Yes in S302), the screen transition aggregation unit 12 acquires one screen ID from the beginning of the end list (S303). The acquired screen ID is deleted from the end list. A screen related to the acquired screen ID is hereinafter referred to as a "target screen".

The screen transition aggregation unit 12 specifies the screen (hereinafter referred to as a "transition source screen") that is the transition source of the target screen in the screen transition diagram X' (S304). The transition source of the target screen means the transition source of the transition with the target screen as the transition destination. The screen transition aggregation unit 12 determines whether or not the transition source screen is the TOP screen (root node screen) (S305). When the transition source screen is the TOP screen (No in S305), the process returns to Step S302. When the transition source screen is not the TOP screen (Yes in S305), the screen transition aggregation unit 12 adds the screen ID of the transition source screen to the end list (S306).

The screen transition aggregation unit 12 calculates the degree of similarity between the target screen and the transition source screen by using a well-known automatic screen classification method (S307).

Figure 9:
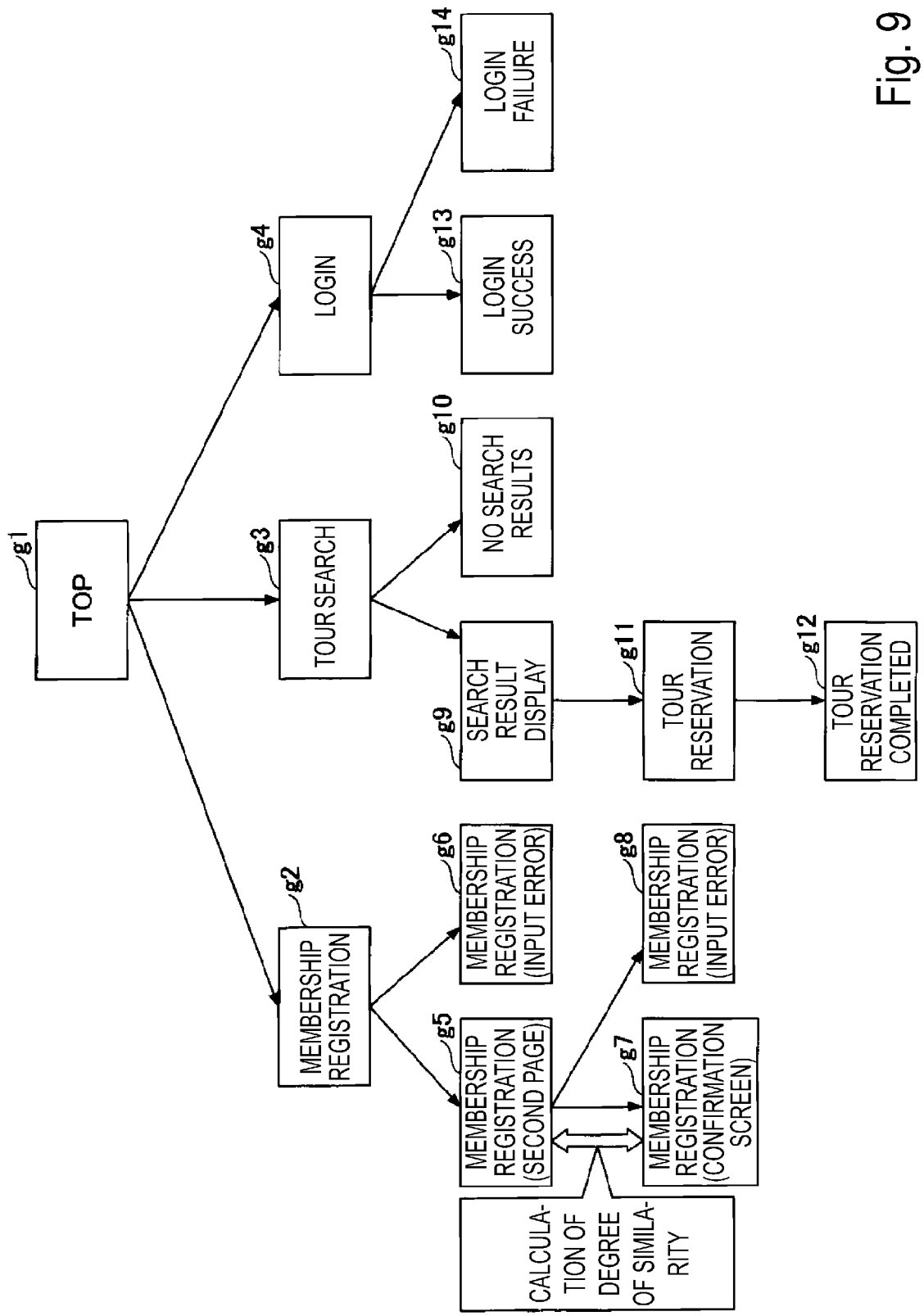
FIG. 9 is a first diagram illustrating an example of an end screen and a transition source screen that are calculation targets of a degree of similarity.

FIG. 9 is a first diagram illustrating an example of an end screen and the transition source screen that are calculation targets of the degree of similarity. FIG. 9 illustrates an example in which a screen g7 being an end screen, and a screen g5 being a transition source screen are calculation targets of the degree of similarity.

The screen transition aggregation unit 12 compares the degree of similarity with a preset threshold value (S308). When the degree of similarity is equal to or greater than the threshold value (Yes in S308), the screen transition aggregation unit 12 classifies the target screen and the transition source screen into the same group, and causes the process to return to Step S302 (S309). Specifically, when the transition source screen does not belong to any group, the screen transition aggregation unit 12 generates a new group including the target screen and the transition source screen. When the transition source screen already belongs to any of the groups, the screen transition aggregation unit 12 includes the target screen in the group. When the target screen already belongs to another group, the screen transition aggregation unit 12 includes a screen group (that is, screen group belonging to the same group as the target screen among screen groups of transition destinations of the target screen) in the same group as the transition source screen.

Figure 10:
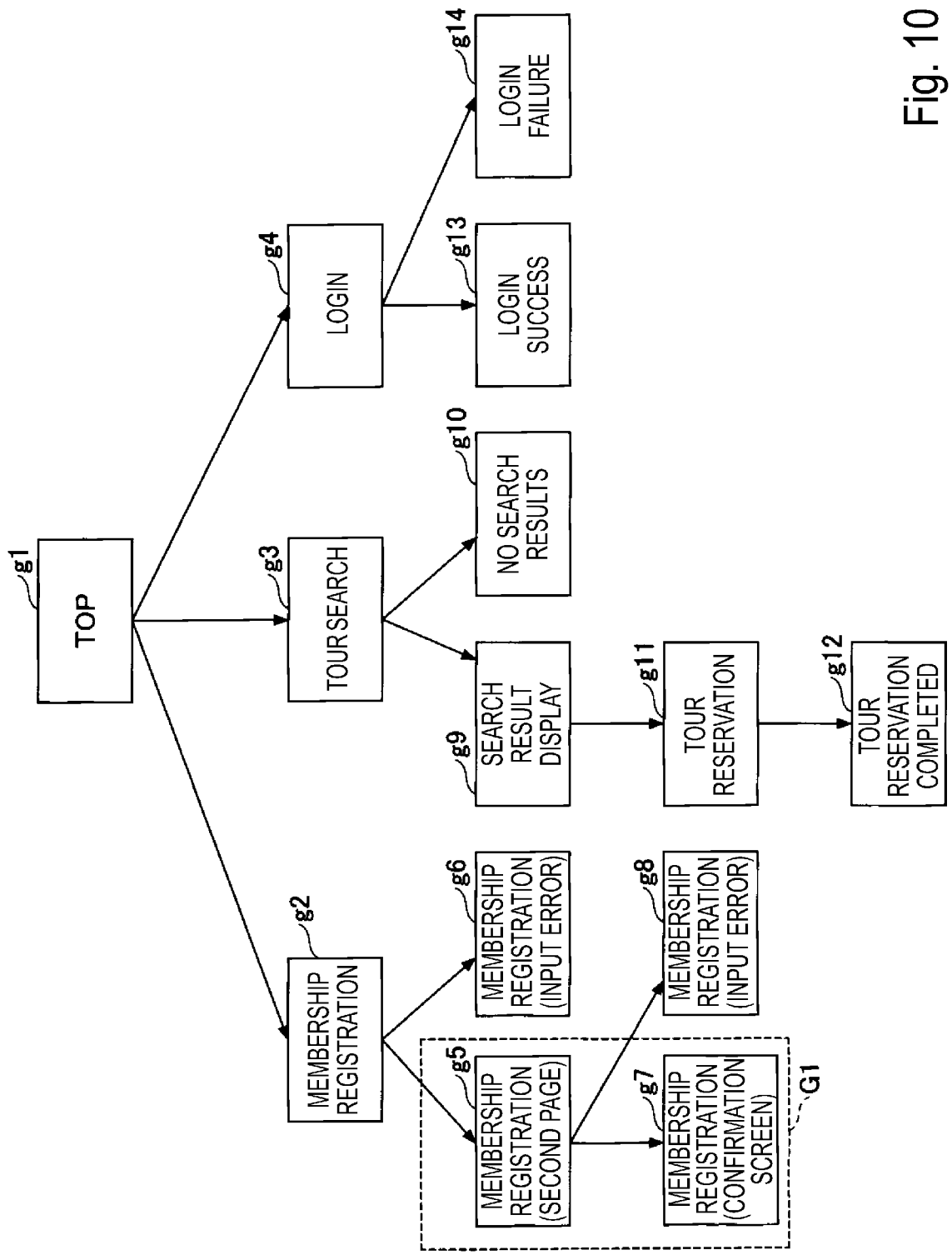
FIG. 10 is a first diagram illustrating an example of a grouping result between the end screen and the transition source screen.

FIG. 10 is a first diagram illustrating an example of a grouping result between the end screen and the transition source screen. FIG. 10 illustrates an example in which a group G1 including the screen g5 and the screen g7 is generated because the degree of similarity between the screen g5 and the screen g7 is equal to or greater than the threshold value.

Figure 11:
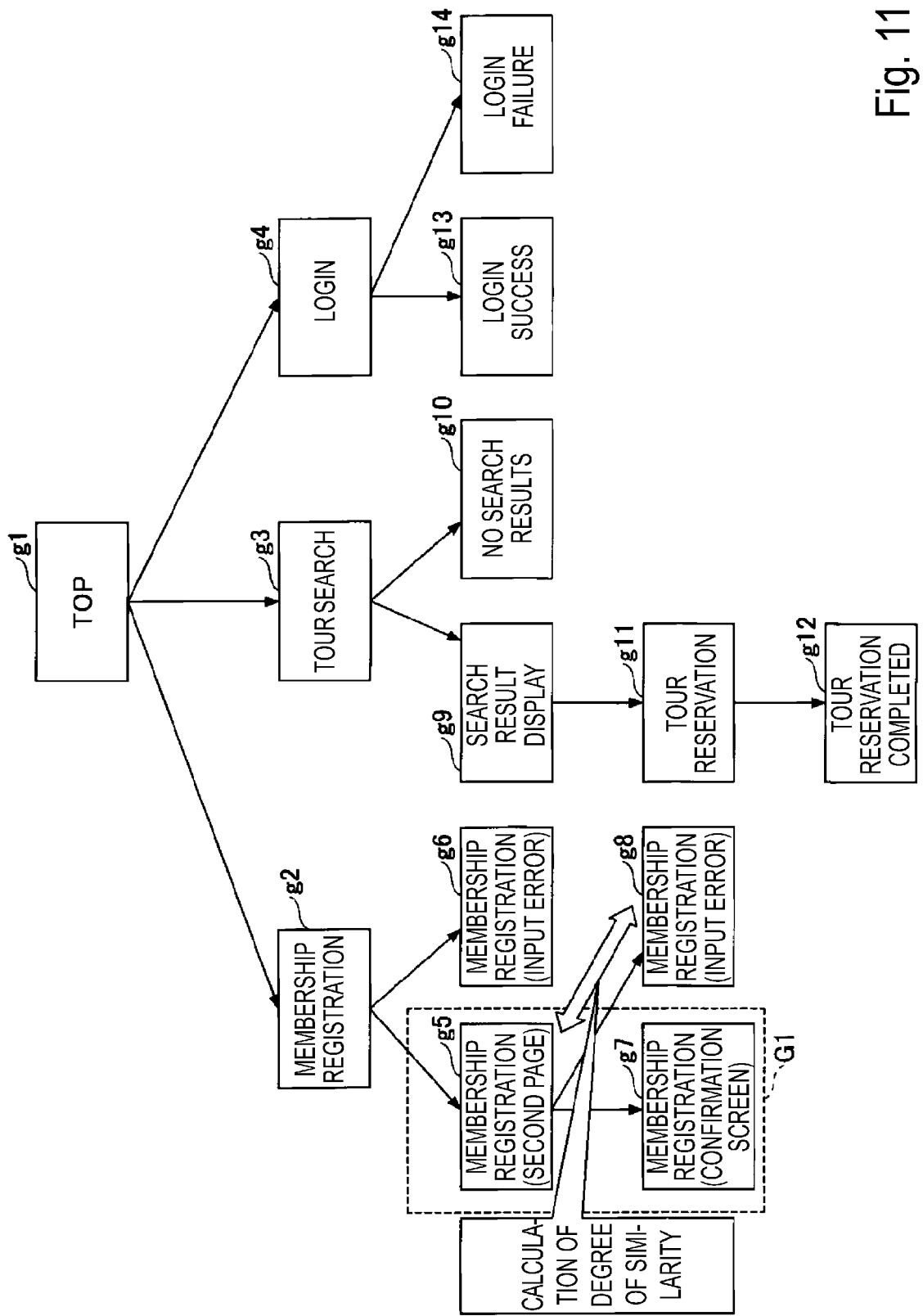
FIG. 11 is a second diagram illustrating an example of the end screen and the transition source screen that are the calculation targets of the degree of similarity.
Figure 12:
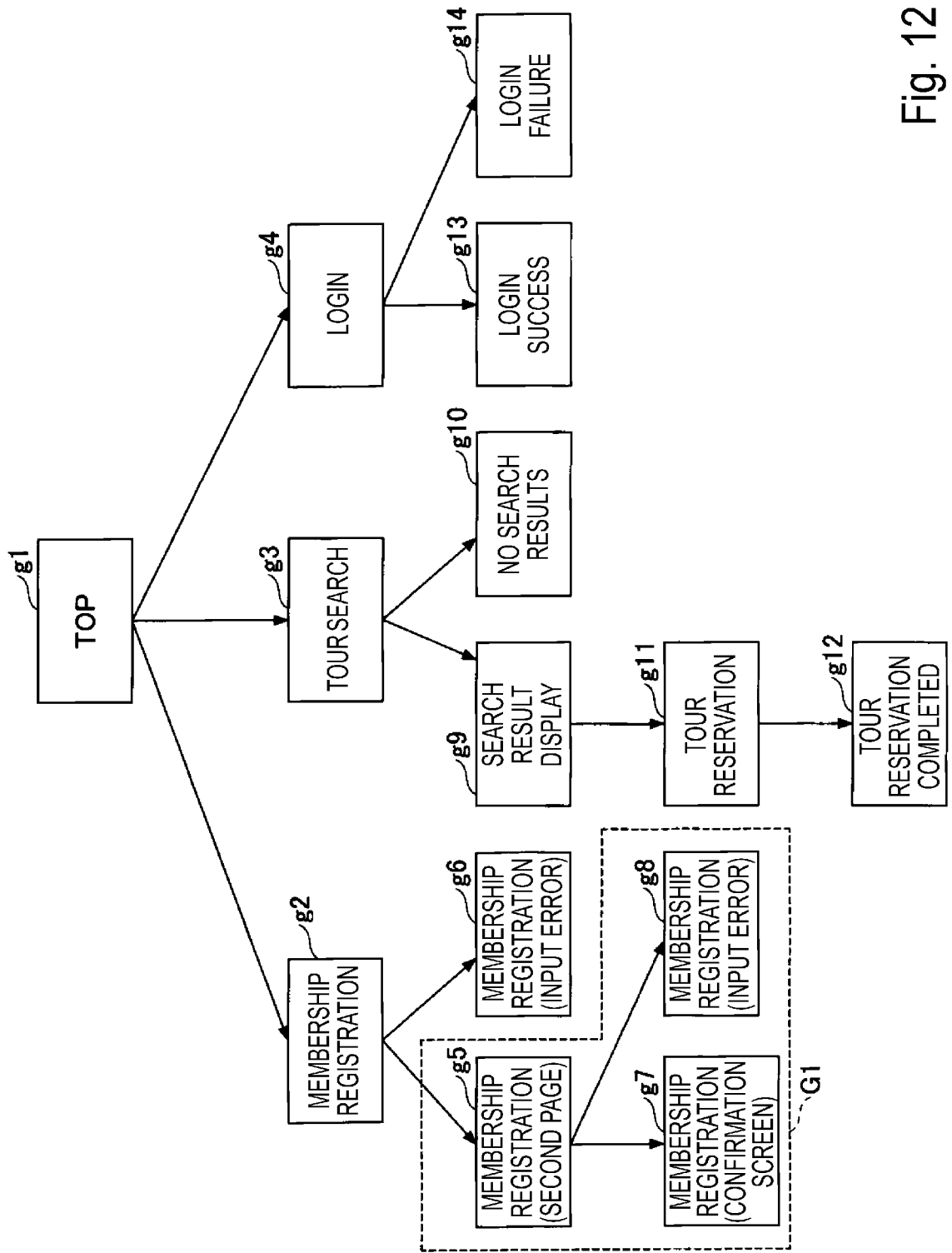
FIG. 12 is a second diagram illustrating an example of the grouping result between the end screen and the transition source screen.

FIG. 11 illustrates an example in which a screen g8 and the screen g5 are set to calculation targets of the degree of similarity. When the degree of similarity is equal to or greater than the threshold value, the screen g8 is classified into the group G1 to which the screen g5 belongs, as illustrated in FIG. 12. When the degree of similarity is smaller than the threshold value (No in S308), the process returns to Step S302. Thus, in this case, the target screen is not classified into the same group as the transition source screen.

Step S303 and the subsequent steps are executed for all end screens in which the screen ID is stored in the end list in Step S301.

Figure 13:
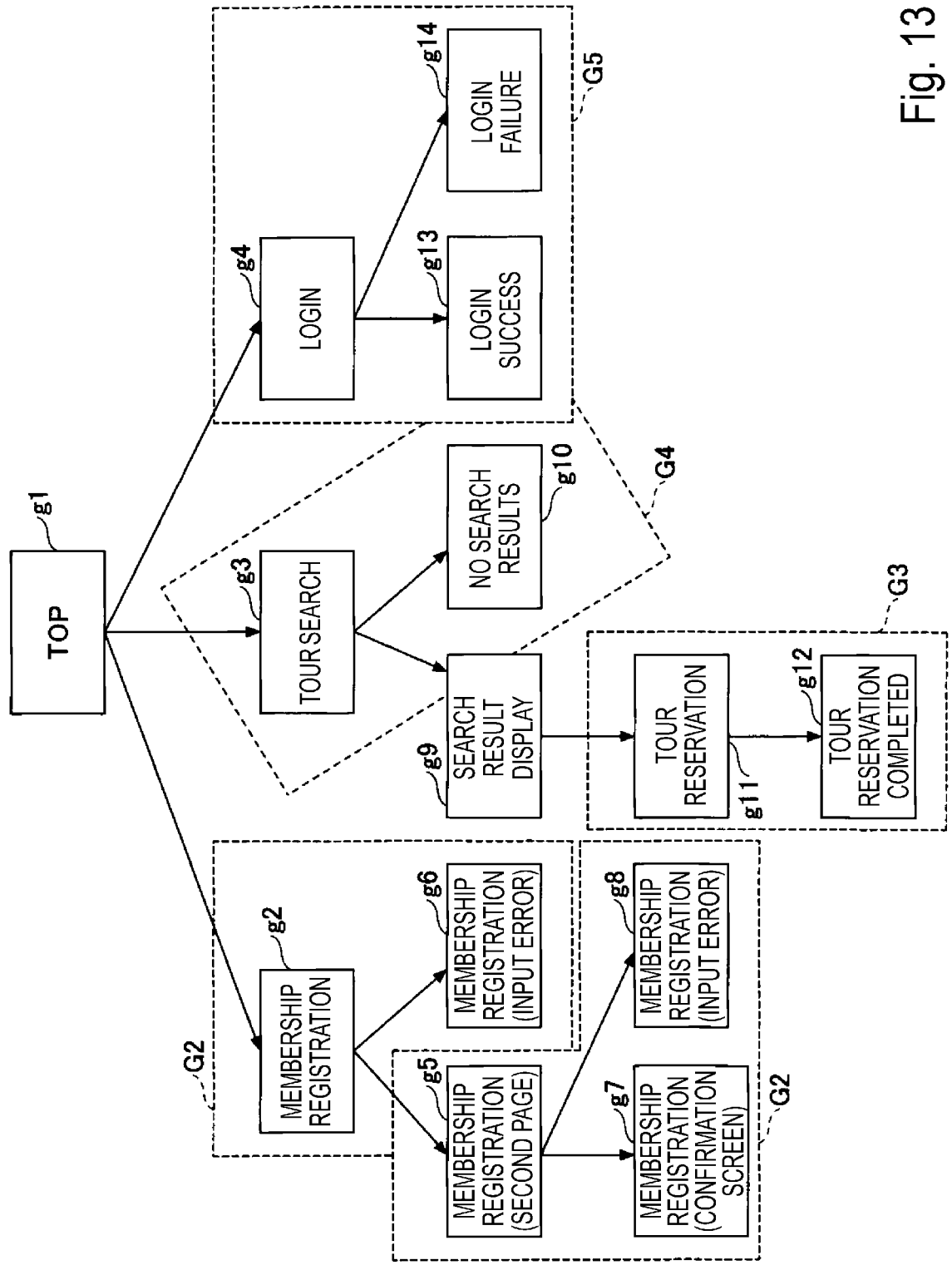
FIG. 13 is a diagram illustrating an example of a grouping result after the degree of similarity with the transition source screen is calculated for all end screens.

FIG. 13 is a diagram illustrating an example of the grouping result after the degree of similarity with the transition source screen is calculated for all end screens. FIG. 13 illustrates an example in which groups G2 to G5 are generated in addition to group G1.

Figure 14:
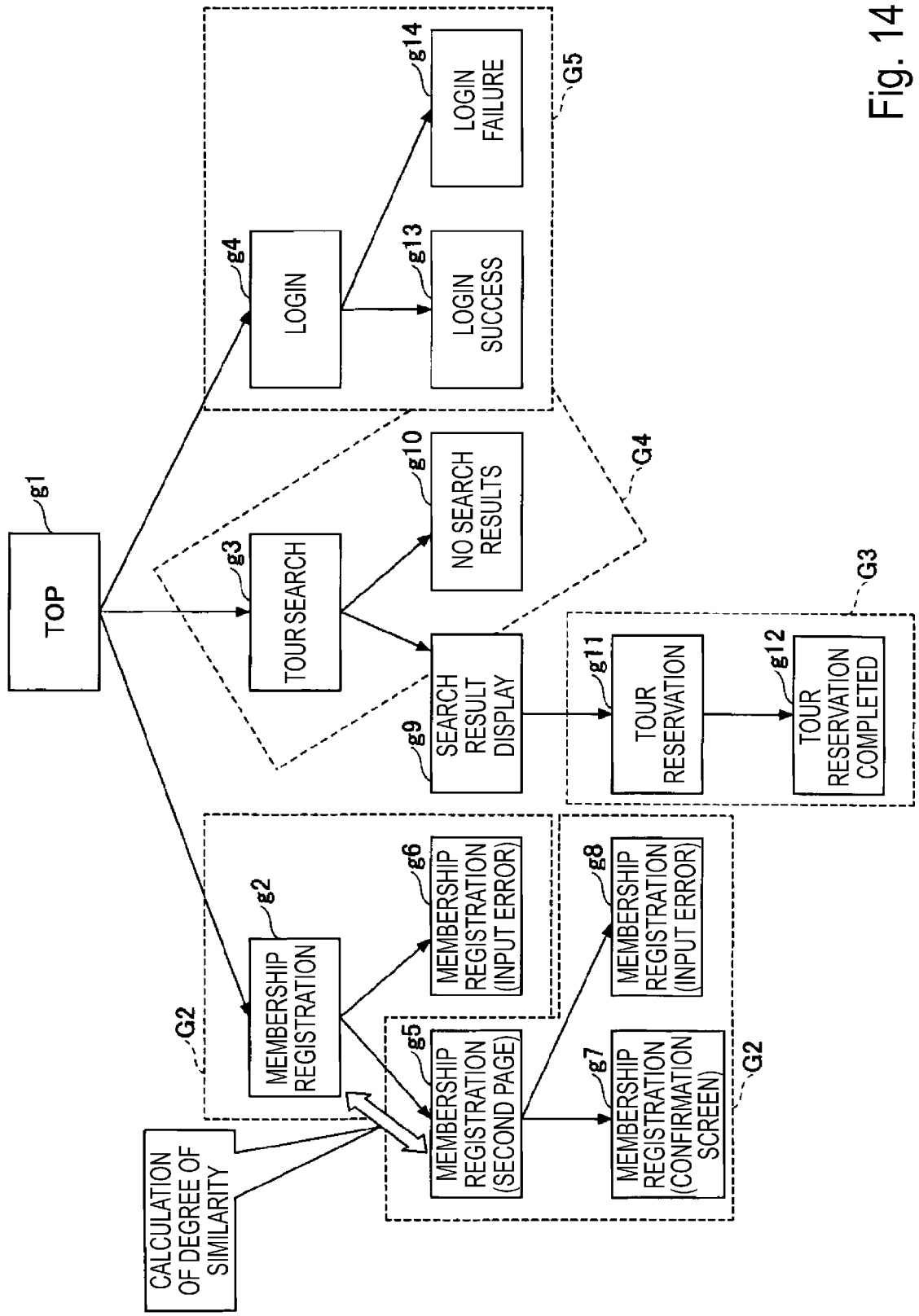
FIG. 14 is a first diagram illustrating an example in which the degree of similarity of the transition source screen right before an end screen with the further transition source screen in two steps before the end screen is calculated.
Figure 15:
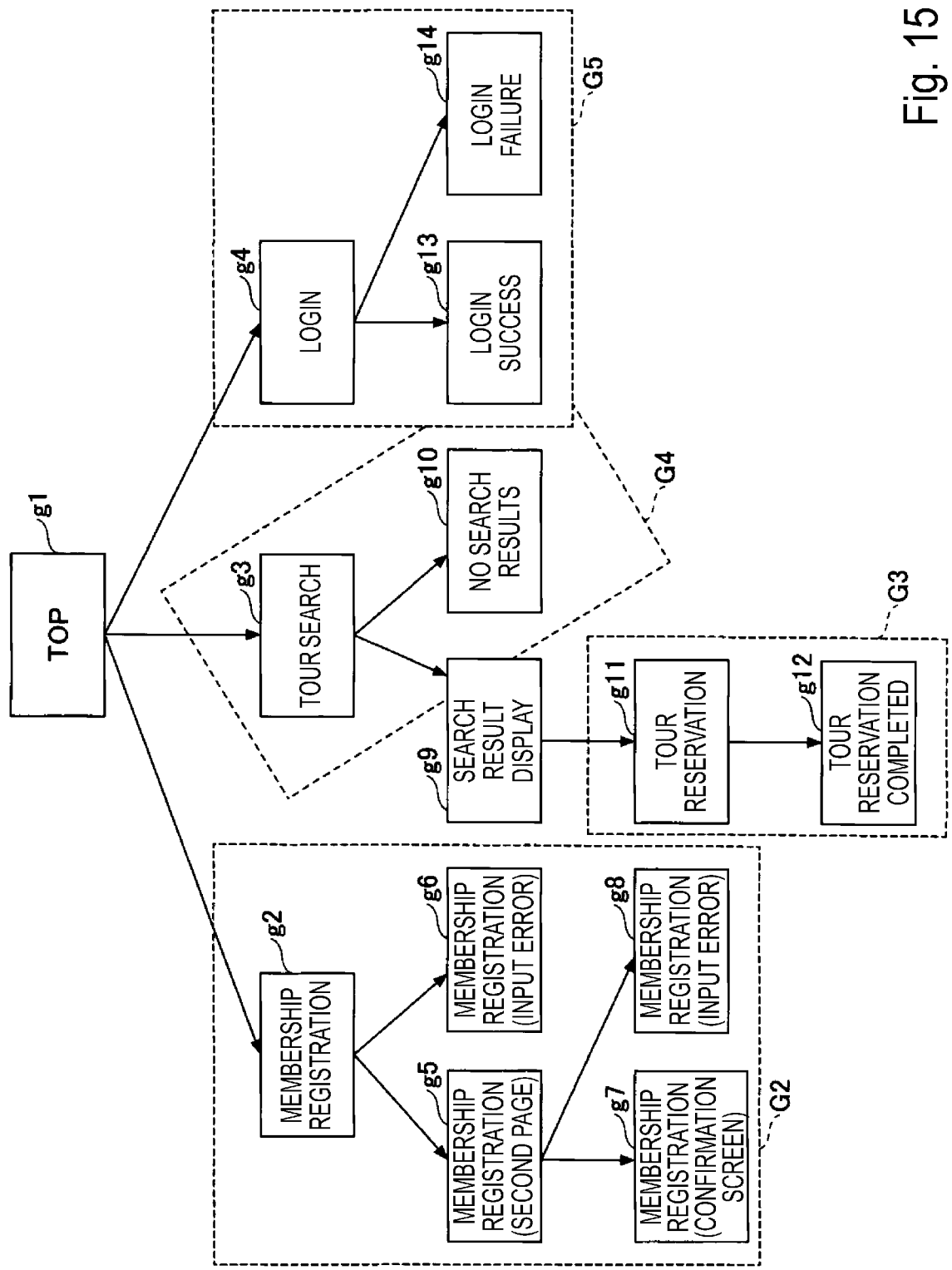
FIG. 15 is a diagram illustrating an example in which the transition source screen right before an end screen is classified into a group of the further transition source screen in two steps before the end screen.

Step S303 and the subsequent steps are also executed for the transition source screen having a screen ID that is added to the end list in Step S306. For example, FIG. 14 illustrates an example in which the degree of similarity between the screen g5 and the screen g2 is calculated. When the degree of similarity is equal to or greater than the threshold value, as illustrated in FIG. 15, the screen g5, and the screen g7 and the screen g8 belonging to the same group G1 as the screen g5 are included in the group G2 to which the screen g2 belongs (group G1 is absorbed by group G2).

Figure 16:
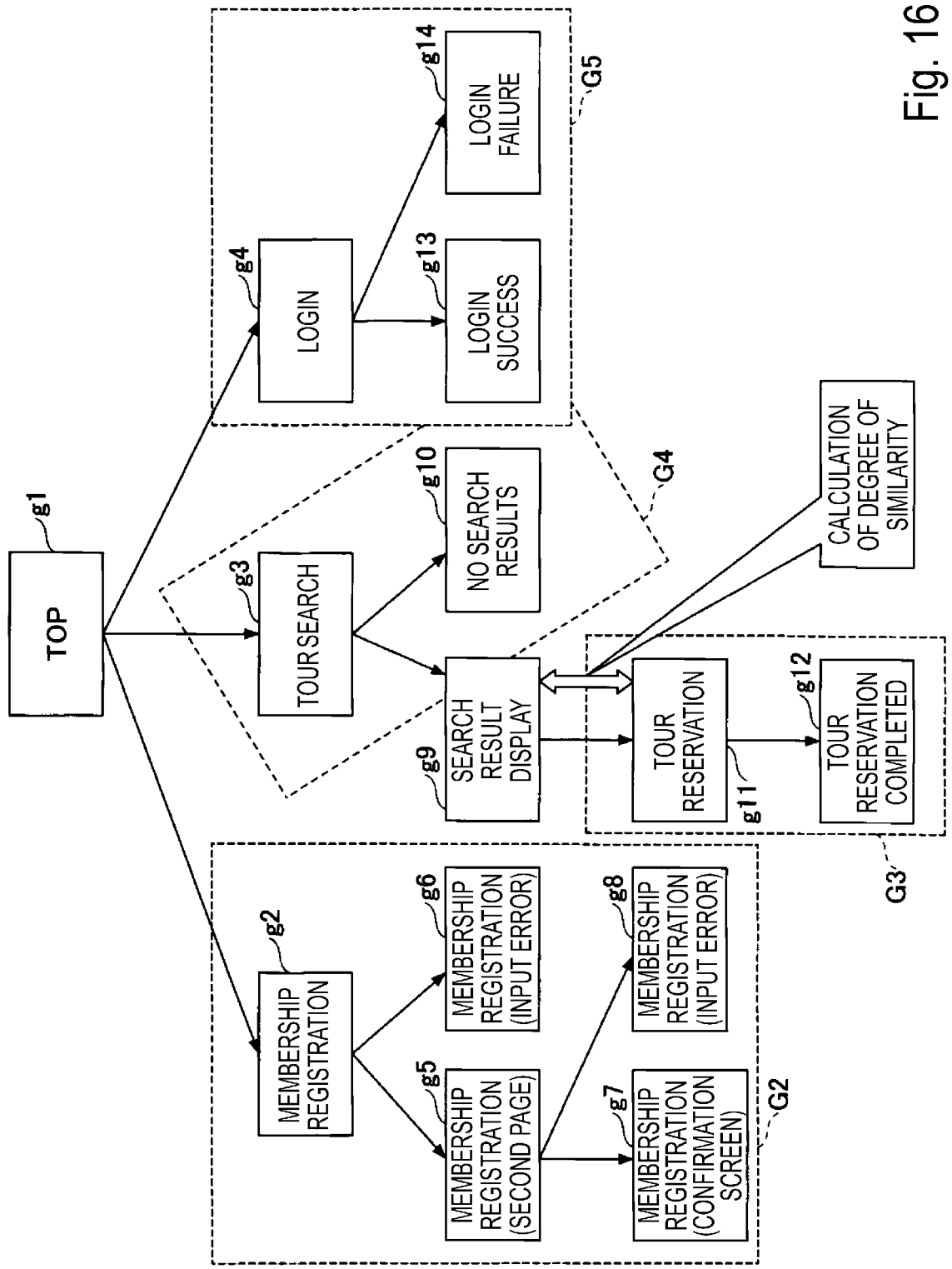
FIG. 16 is a second diagram illustrating an example in which the degree of similarity of the transition source screen right before the end screen with the further transition source screen in two steps before the end screen is calculated.
Figure 17:
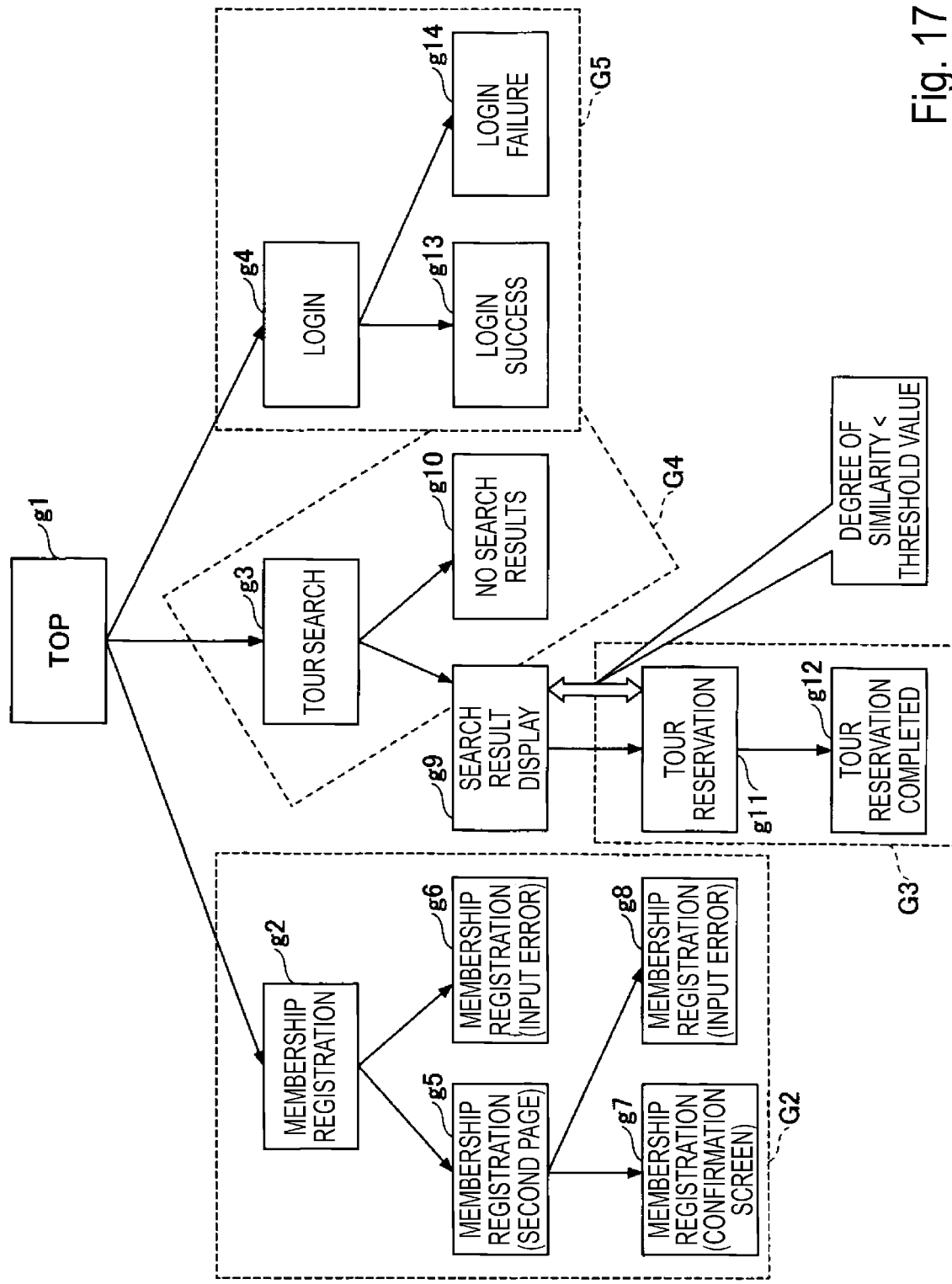
FIG. 17 is a diagram illustrating an example in which the transition source screen right before the end screen is not classified into the same group as the further transition source screen in two steps before the end screen.

Similarly, as illustrated in FIG. 16, the degree of similarity of a screen g11 with the screen g9 is calculated. When the degree of similarity is smaller than the threshold value, the screen g11 is not classified in the same group as the screen g9, as shown in FIG. 17.

Figure 18:
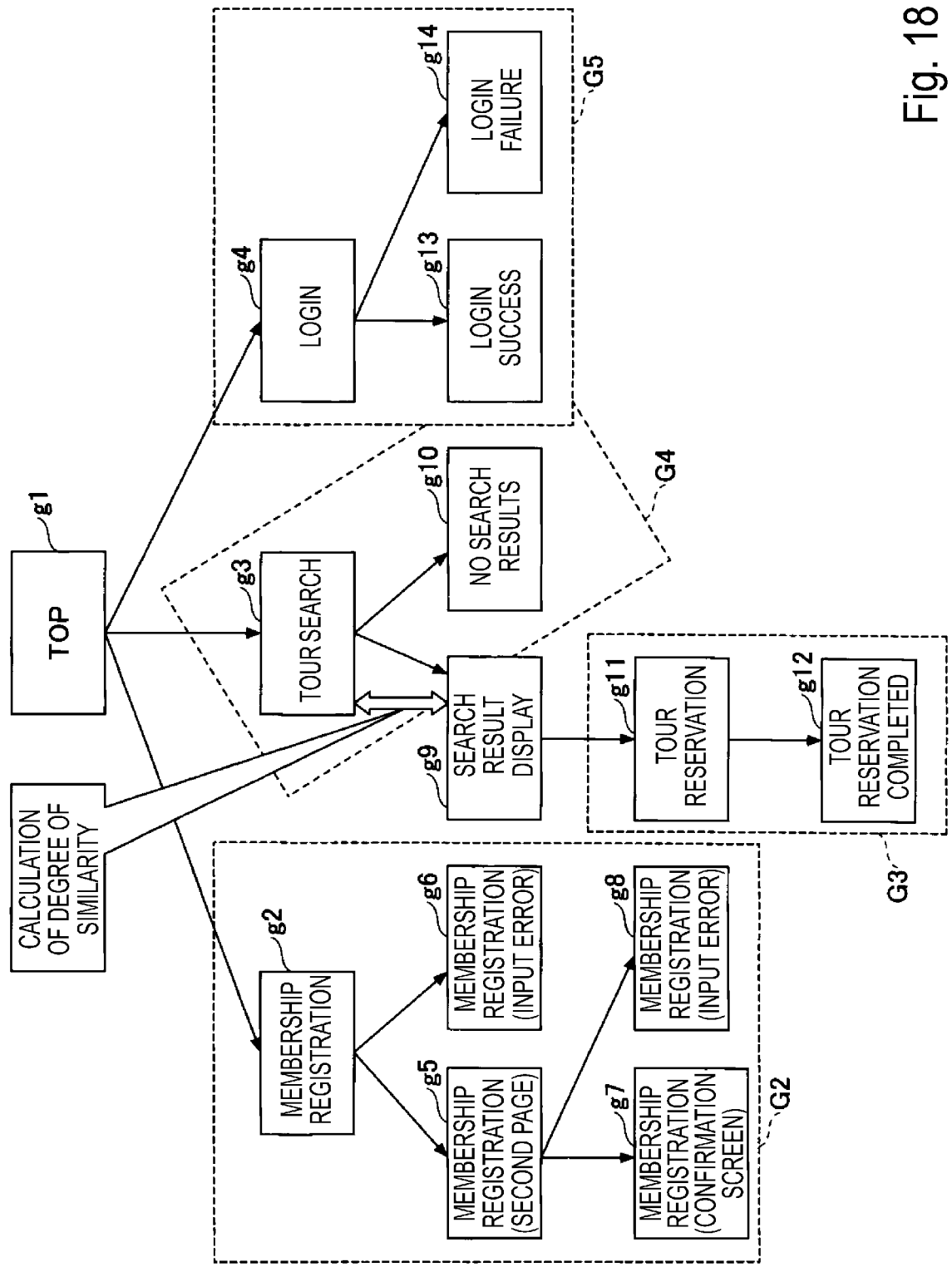
FIG. 18 is a diagram illustrating an example in which the degree of similarity of the transition source of the transition source screen with the further transition source screen in three steps before the end screen is calculated.
Figure 19:
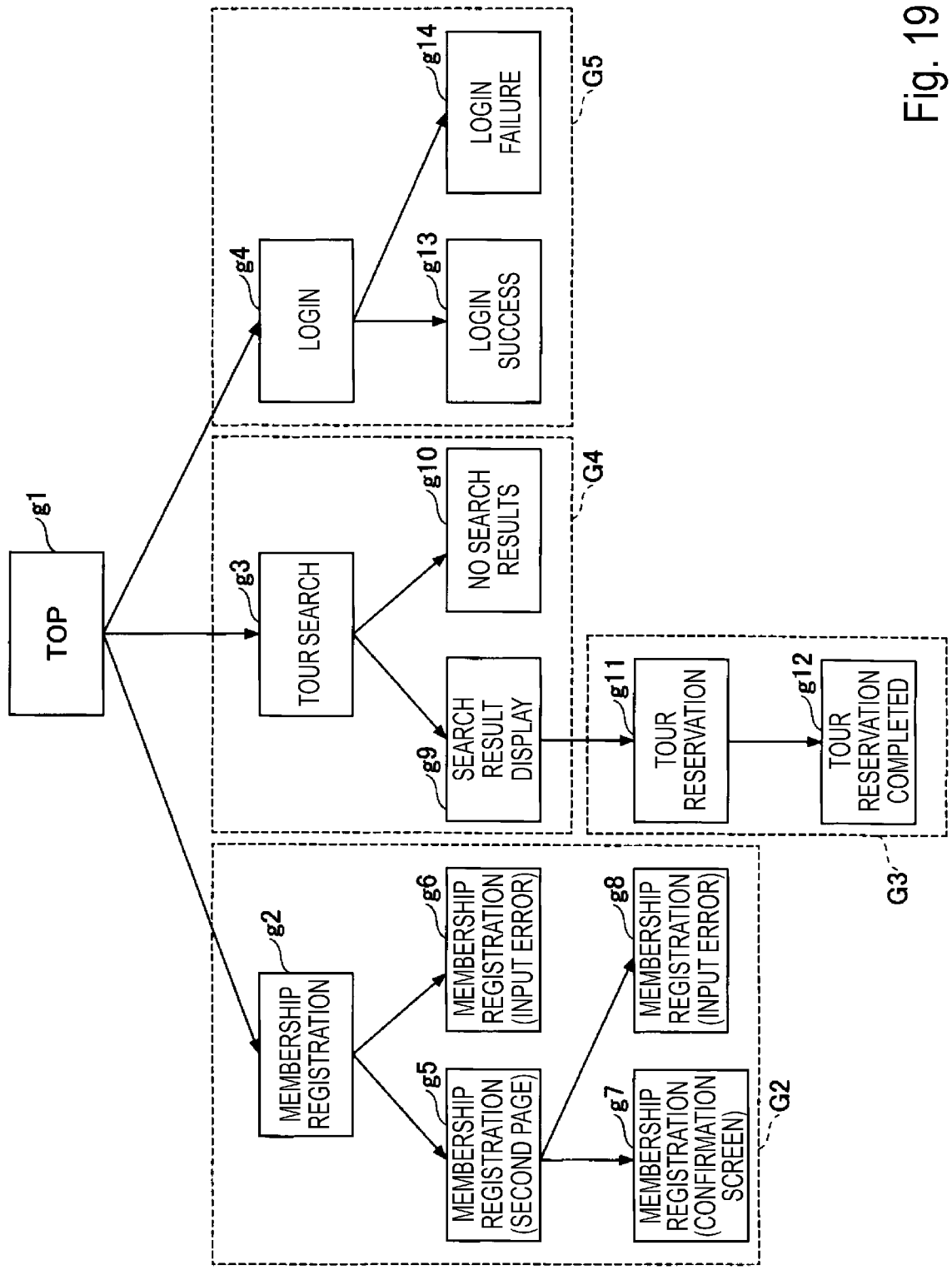
FIG. 19 is a diagram illustrating an example of a grouping between the transition source of the transition source screen and the further transition source screen in three steps before the end screen.

In Step S306, not only the transition source screen of the end screen but also the screen ID of a transition source screen of the transition source screen of any screen may be added to the end list. Thus, Step S303 and the subsequent steps are also executed for the transition source of the transition source screen. For example, FIG. 18 illustrates an example in which the degree of similarity between the screen g9 and the screen g3 is calculated. When the degree of similarity is equal to or greater than the threshold value, the screen g9 is included in the group G4 to which the screen g3 belongs, as illustrated in FIG. 19. Before the screen g3 is included in the group G4, there is no screen belonging to the same group as the screen g9. Thus, only the screen g9 is newly included in the group G4.

When the end list is empty (No in S303), the screen transition aggregation unit 12 generates a functional flow diagram having each group generated in Step S309 as a node, and displays (outputs) the functional flow diagram on the display device 106 (S310).

In the embodiment, the result of the grouping illustrated in FIG. 19 is output as the functional flow diagram.

Figure 20:
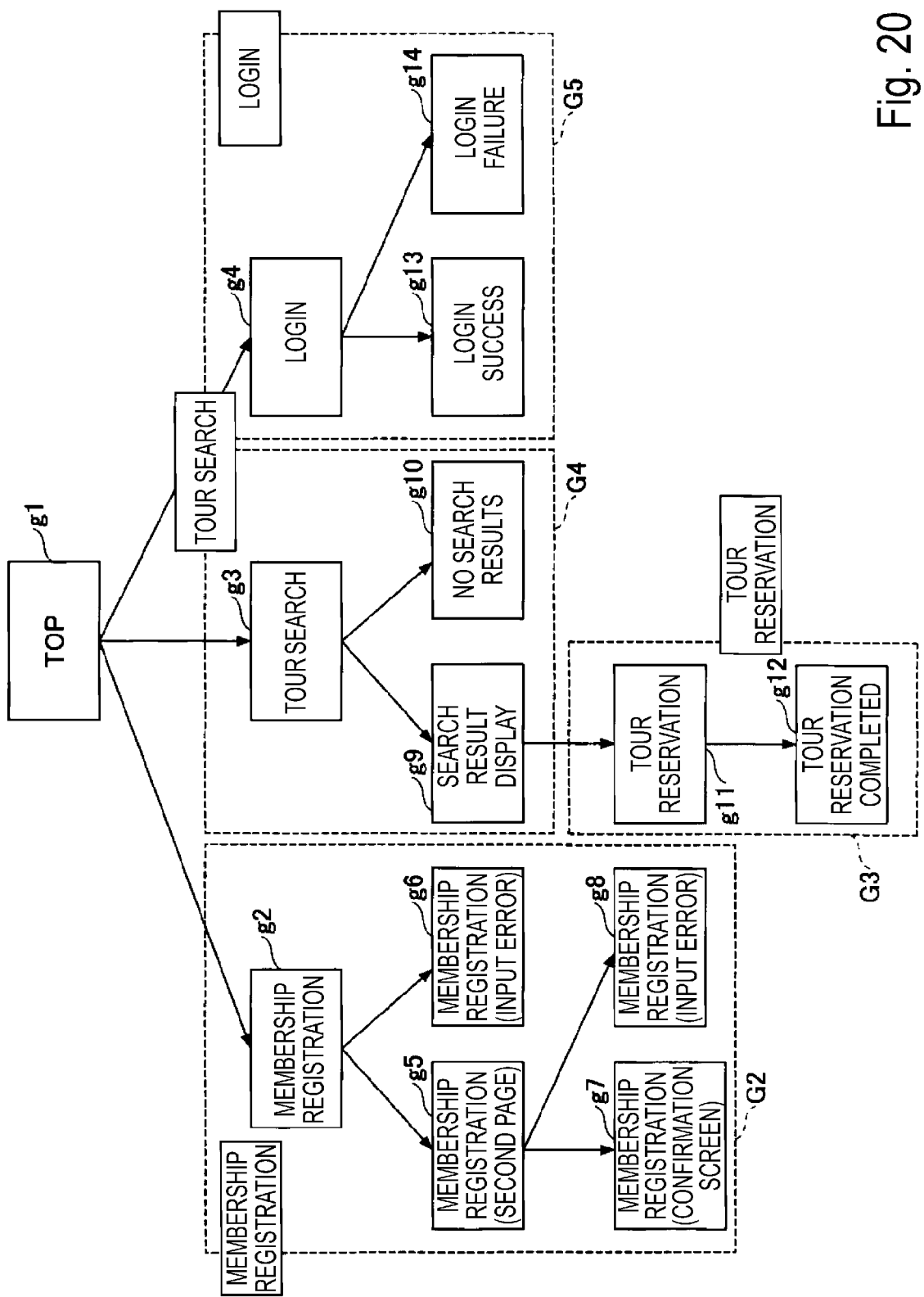
FIG. 20 is a diagram illustrating an example of the functional flow diagram in which a function name is assigned to each group.

In this case, in Step S104 of FIG. 5, for example, as illustrated in FIG. 20, a name (function name) of a function may be assigned to each group.

FIG. 20 is a diagram illustrating an example of the functional flow diagram in which a function name is assigned to each group. FIG. 20 illustrates an example in which "membership registration" is assigned as the function name to the group G2, "tour search" is assigned as the function name to the group G4, "login" is assigned as the function name to the group G5, and "tour reservation" is assigned as the function name to the group G3. The function name may be assigned by operating the functional flow diagram displayed on the display device 106.

Figure 21:
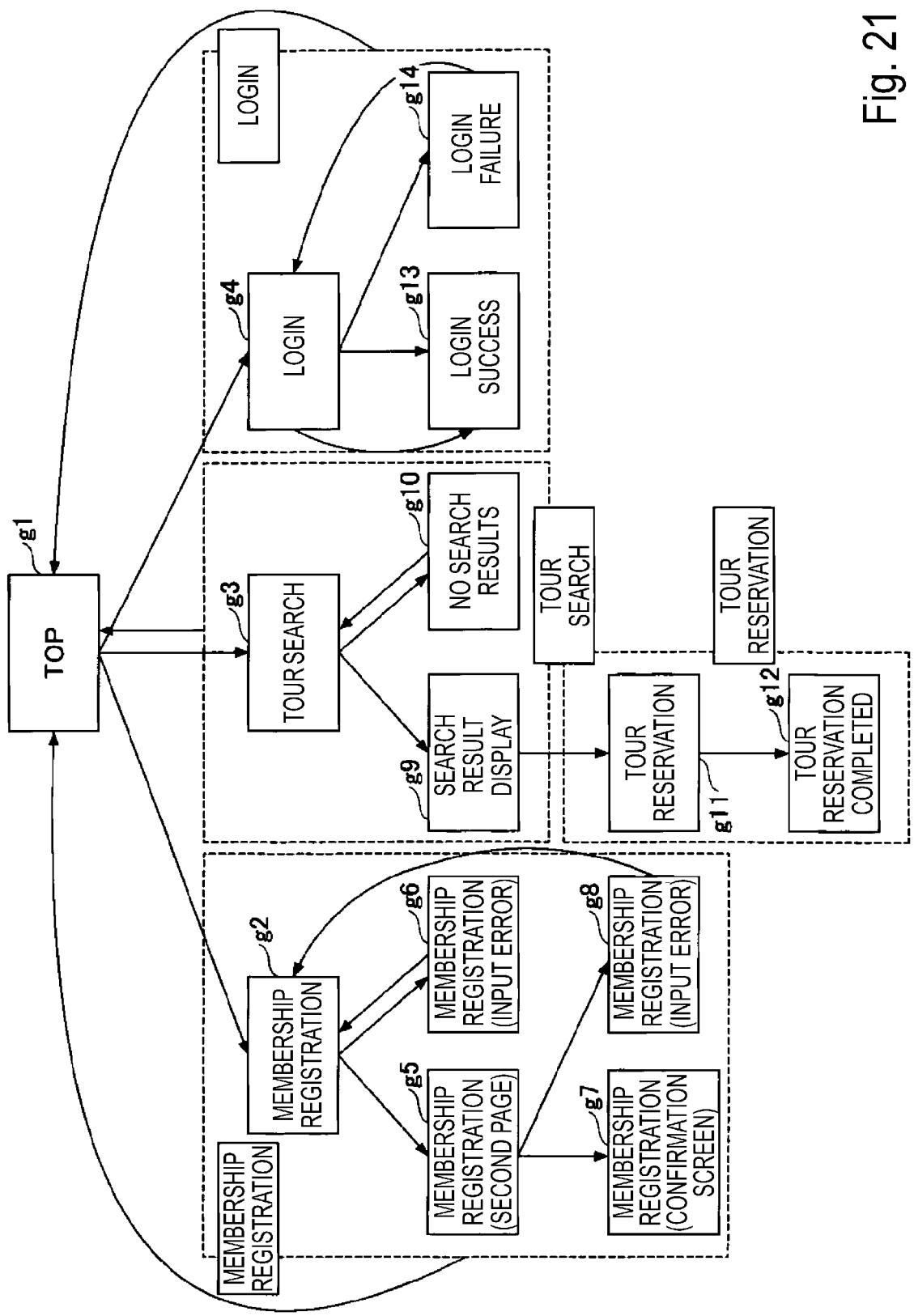
FIG. 21 is a diagram illustrating an example of a functional flow diagram in which the deleted transition is restored.

In Step S105 of FIG. 5, the deleted transition is restored, as illustrated in FIG. 21, for example.

FIG. 21 is a diagram illustrating an example of a functional flow diagram in which the deleted transition is restored. In FIG. 21, the transition that is present in FIG. 1, but is deleted in FIG. 7 is restored. The transitions across the groups are aggregated in units of groups. For example, the transition from each screen to TOP is aggregated in the transition from the group to which each screen belongs to TOP. That is, the screen transition aggregation unit 12 aggregates the transitions of common transition destinations within a certain group into one transition, and then restores the transitions after the aggregation, in a functional flow diagram. In this state, the functional flow diagram is completed. The transition is restored, thereby restoring the relationship between the groups (functions).

As described above, according to the embodiment, the screens being nodes in the screen transition diagram are classified into groups based on similarity of the screen, and a functional flow diagram is generated with the group as a node. Here, the high similarity of the screen is considered to have high commonality of functions. This is because screens having common functions tend to have similar screen layouts and character strings contained in the screens. Thus, the functional flow diagram is considered to be a diagram illustrating the flow of functions of the target application. According to such a functional flow diagram, it is possible to improve the ease of grasping the specifications of an application that provides a function by screen transition, in comparison to the screen transition diagram in which the transition is expressed in units of screens.

In the embodiment, the degree of similarity between the screens is calculated in a state where the transition that is not included in the shortest path to each screen is deleted. As a result, for example, a detour route via a transition unrelated to the function (for example, transition based on a link to another site) or a transition from the end screen to the TOP screen is deleted. Thus, it is possible to avoid execution of calculating the degree of similarity between screens unrelated to the function and to avoid classification of the screens into the same group. As a result, it is possible to increase the possibility of obtaining a functional flow diagram illustrating a functional flow close to the original functional flow of the target application.

The embodiment may be applied to an application other than the Web application so long as the application provides the function by the screen transition.

In the embodiment, the screen transition aggregation unit 12 is an example of the calculation unit, the generation unit, the specifying unit, the deletion unit, and the specification information restoration unit 11.

Although the embodiment of the present invention has been described above, the present invention is not limited to such specific embodiments, and can be modified and changed variously without departing from the scope of the invention described in the appended claims.

REFERENCE SIGNS LIST

10 Screen transition aggregation device
11 Specification information restoration unit 12 Screen transition aggregation unit
100 Drive device
101 Recording medium
102 Auxiliary storage device
103 Memory device
104 CPU
105 Interface device
106 Display device
107 Input device
B Bus

The invention claimed is:

1. A screen transition aggregation device comprising a processor configured to execute operations comprising:
    calculating a degree of similarity between a transition destination screen of an application and a transition source screen of the application in a sequence starting from an end screen of the application in a screen transition diagram of the application toward preceding screens of the application; and
    determining a first group of a plurality of groups associated with the transition destination screen and the transition source screen based on a comparison between the degree of similarity and a threshold value, wherein the first group corresponds to a function of the application; and
    generating data indicating a transition relationship between the first group and a second group of the plurality of groups, the second group is adjacent to the first group according to the screen transition diagram, and the transition relationship is associated with a transition of functions of the application for testing the application.

2. The screen transition aggregation device according to claim 1, the processor further configured to execute operations comprising:
    specifying a shortest path from a screen of a root node to a screen in the screen transition diagram; and
    deleting a transition that is not included in the shortest path from the screen transition diagram.

3. The screen transition aggregation device according to claim 2,
    wherein the calculating further comprises calculating the degree of similarity between the transition destination screen and the transition source screen associated with the deleted transition in the screen transition diagram, and
    the processor further configured to execute operations comprising:
    restoring the deleted transition for the data indicating the transition relationship between the first group and the second group.

4. The screen transition aggregation device according to claim 2, wherein the degree of similarity between the transition destination screen and the transition source screen is based on the shortest path between the transition destination screen and the transition source screen.

5. The screen transition aggregation device according to claim 2, wherein the screen transition diagram includes a plurality of nodes, each node representing a screen.

6. The screen transition aggregation device according to claim 2, wherein the screen transition diagram includes an edge between a plurality of nodes, the link representing a transition of screens from the transition source screen to the transition destination screen.

7. The screen transition aggregation device according to claim 2, wherein the first group is combinable with the second group to represent a combined function of an application.

8. A computer-implemented method for aggregating screen transition, the method comprising:
    calculating a degree of similarity between a transition destination screen of an application and a transition source screen of the application in a sequence starting from an end screen of the application in a screen transition diagram of the application toward preceding screens of the application; and
    determining a first group of a plurality of groups associated with the transition destination screen and the transition source screen based on a comparison between the degree of similarity and a threshold value, wherein the first group corresponds to a function of the application; and
    generating data indicating a transition relationship between the first group and a second group of the plurality of groups, the second group is adjacent to the first group according to the screen transition diagram, and the transition relationship is associated with a transition of functions of the application for testing the application.

9. The computer-implemented method according to claim 8, further comprising:
    specifying a shortest path from a screen of a root node to a screen in the screen transition diagram; and
    deleting a transition that is not included in the shortest path from the screen transition diagram.

10. The computer-implemented method according to claim 9,
    wherein the calculating further comprises calculating the degree of similarity between the transition destination screen and the transition source screen associated with the deleted transition in the screen transition diagram, and
    the computer-implemented method further comprises restoring the deleted transition for the data indicating the transition relationship between the groups.

11. A computer-readable non-transitory recording medium storing computer-executable program instructions that when executed by a processor cause a computer system to execute operations comprising:
    calculating a degree of similarity between a transition destination screen of an application and a transition source screen of the application in a sequence starting from an end screen of the application in a screen transition diagram of the application toward preceding screens of the application; and
    determining a first group of a plurality of groups associated with the transition destination screen and the transition source screen based on a comparison between the degree of similarity and a threshold value, wherein the first group corresponds to a function of the application; and
    generating data indicating a transition relationship between the first group and a second group of the plurality of groups, the second group is adjacent to the first group according to the screen transition diagram, and the transition relationship is associated with a transition of function of the application for testing the application.

12. The computer-implemented method according to claim 9, wherein the screen transition diagram includes a plurality of nodes, each node representing a screen.

13. The computer-implemented method according to claim 9, wherein the degree of similarity between the transition destination screen and the transition source screen is based on the shortest path between the transition destination screen and the transition source screen.

14. The computer-implemented method according to claim 9, wherein the first group is combinable with the second group to represent a combined function of an application.

15. The computer-implemented method according to claim 9, wherein the screen transition diagram includes an edge between a plurality of nodes, the link representing a transition of screens from the transition source screen to the transition destination screen.

16. The computer-readable non-transitory recording medium of claim 15, the computer-executable program instructions when executed further causing the system to execute operations comprising:
specifying a shortest path from a screen of a root node to a screen in the screen transition diagram; and
deleting a transition that is not included in the shortest path from the screen transition diagram.

17. The computer-readable non-transitory recording medium of claim 16,
wherein the calculating further comprises calculating the degree of similarity between the transition destination screen and the transition source screen associated with the deleted transition in the screen transition diagram, and
the computer-executable program instructions when executed further causing the system to execute operations comprising: restoring the deleted transition for the data indicating the transition relationship between the first group and the second group.

18. The computer-readable non-transitory recording medium of claim 16, wherein the degree of similarity between the transition destination screen and the transition source screen is based on the shortest path between the transition destination screen and the transition source screen.

19. The computer-readable non-transitory recording medium of claim 16,
wherein the screen transition diagram includes a plurality of nodes, each node representing a screen, and
wherein the screen transition diagram includes an edge between a plurality of nodes, the link representing a transition of screens from the transition source screen to the transition destination screen.

20. The computer-readable non-transitory recording medium of claim 16, wherein the first group is combinable with the second group to represent a combined function of an application.

* * * * *